United States Patent [19]
Nader-Esfahani

[11] Patent Number: 5,556,184
[45] Date of Patent: Sep. 17, 1996

[54] IMAGINOGRAPH

[76] Inventor: Rahim Nader-Esfahani, 141 Crickle Wood Lane, London, England, NW2 1HS

[21] Appl. No.: 211,639

[22] PCT Filed: Sep. 21, 1992

[86] PCT No.: PCT/GB92/01734

§ 371 Date: Apr. 11, 1994

§ 102(e) Date: Apr. 11, 1994

[87] PCT Pub. No.: WO93/07532

PCT Pub. Date: Apr. 15, 1993

[30] Foreign Application Priority Data

Oct. 9, 1991 [GB] United Kingdom ............... 9121418

[51] Int. Cl.⁶ .................................................. G03B 35/00
[52] U.S. Cl. ............................................. 353/10; 359/478
[58] Field of Search ........................ 353/10, 7; 359/478, 359/462, 464; 352/60, 57, 58, 86

[56] References Cited

U.S. PATENT DOCUMENTS

| | | | |
|---|---|---|---|
| 4,815,819 | 3/1989 | Mayhew et al. | 359/478 |
| 4,911,530 | 3/1990 | Lo | 359/464 |
| 5,270,751 | 12/1993 | Christian | 353/7 |
| 5,365,370 | 11/1994 | Hodgins | 359/464 |

Primary Examiner—William C. Dowling
Attorney, Agent, or Firm—Breiner & Breiner

[57] ABSTRACT

Imaginograph is an image on a screen which is mathematically generalized optical illusion to create psychological three dimensionality. These pictures are the would be "merged images in the brain" produced outside the brain. Rather than creating one picture for the left eye and another for the right, an Imaginograph is already the result of the analyzed signals. Using the property that when one is looking at a flat picture, the brain superimposes the two substantially same images in the left and right eyes and produces the same picture in the brain, Imaginographs are pictures which are formed by superimposing the left and right eye views at the same position as the object of interest in the view, keeping the images of the object of interest in the two pictures in register at all times. The left and right eye views and their projections can be generalized to obtain three dimensional views of non-Euclidean spaces.

7 Claims, 2 Drawing Sheets

IMAGINOGRAPH

TECHNICAL FIELD

This invention relates to pictures in general. The more specific field is pictures in three and four dimensions i.e. the variations of the three dimensional pictures in time both for still & moving objects.

BACKGROUND ART

Ever since man opened eyes he had the desire to reproduce reality in the form of drawings and pictures. The invention of photography created a new form of life. There is no home or office, road or a subway that is not filled with pictures. All based on the concepts of a photograph. Everybody has accepted that pictures are projection of reality onto a screen. However all such pictures are based on a single viewpoint. Naturally for a being who looks at the reality with two eyes such pictures cannot reflect the reality as he sees it. Re-creation of reality i.e. the three dimensional pictures has been a continuing subject for inventors in the past hundred and fifty years. The original stereoscopes handled this by providing two different images in front of each eye thereby giving the viewer the feel of seeing different images with each eye and hence the illusion of three dimensionality of the picture. The requirement of having to produce a right eye and a left eye picture and the desirability to have only one screen has given rise to many ingenious methods and instruments. These days the most popular technique is projecting two pictures onto a screen in two different colours and then requiring the viewer to wear glasses with complimentary coloured lenses on each eye. The effect is that each eye would see only one of the pictures, hence giving the viewer the required illusion. This technique is developed to provide means of seeing in colour (for examples see The British Journal of photography 17th Jan. 1991, page 18 or U.S. Pat. No 3,712,199 of 1973 or U.S. Pat. No 4,480,893 of 1984). A similar version of this technique is to use polarised lenses and polarised pictures instead of using complimentary colours. Another old idea which keeps getting reborn is lenticular screens (see for example European patent no EP 0384768 A3 of 1990). The clear advantage of such method is that the viewer does not need to wear special tools for viewing. The desirability of not wearing special tools has in itself created other lines of inventiveness. One such method is to place the right and left eye views side by side, however on the reverse side. The viewer by looking at the two pictures in cross eyed fashion can match the two pictures in a different distance than the screen and gets the three dimensionality illusion. The disadvantage of such method is that it puts too much strain on the eye muscles and the useful part of the view becomes considerably smaller than the screen. Some effort has been put on trying to mix such left and right views (see for example U.S. Pat. No. 4,135,502 of 1992). In this method repeated parallel patterns are created so that the right eye view shares some of the items of the left eye view. When the viewer makes himself cross eyed, distinct patterns are matched as if they were the same item and the viewer sees the pattern in a different position than the screen. This method is of limited use as it can only be used for artificial repeated patterns.

By far the most interesting technique for producing a three dimensional image which does not require special viewing instrument has been the idea of holograms. A hologram by creating wave-fronts produces the illusion of the object itself. With more complicated holograms e.g. a composite hologram, you may even walk around the hologram and view the object from all sides. Holograms however have an inherent problem when it comes to colours. The complication of producing such images and the technical requirements are so demanding that despite much research, all attempts to put movement and stability to the pictures are not properly achieved and there is not yet an acceptable commercial production available.

The basis of all these developments is creation of two different images one for each eye essentially the same as the original stereoscopy. These pictures are merged into each other by the brain and the brain, by comparison of the distinguishing features of different objects in the picture, recognises their relative distances and hence submits to the illusion of three dimensionality. It is rather obvious but necessary to mention that for any of the above techniques, it is necessary that the viewer has at least two eyes to see these pictures. Sensations created by three dimensional pictures are rather complex subject with various effects. When talking about a three dimensional image, one does not mean that the image itself is of three dimensions. It means the viewer believes that the image formed in his brain is originated from real three dimensional objects. The brain, being the complex machine that it is, recognises the three dimensionality of the view in several different ways. These can be classified as follows;

1. Duality: Due to the fact that the eyes are approximately 6.5 cm apart , the images recorded by each eye are different. The location of each object in the two different images which are received by each eye are analysed by the brain thereby one recognises the relative distances of the objects from each other and the view point.

2. Head movements: Movement of the head back & forth, left & right, up & down, rotation along the axis of the top of the nose, rotation along the neck axis, all cause the images in the eyes to vary. By analysing the relative location of objects in these images the brain can analyse their distances.

3. Eye Movements: The movement of the eyeballs within the sockets to concentrate on objects in different distances (cross-eyed for near and parallel for distant objects) and also attempts to focus on an object put different pressures on the muscles of the eye. These pressures are analysed by the brain to recognize their distances.

Essentially it is the comparison of two different situations and their relative distinction which creates the three dimensional effect. Some of these distinctions are instantaneous e.g. seeing two images with each eye at the same time. However some of these relative comparisons are only achieved during time. For example when one walks in front of an object whilst looking at it, the relative position of the object to its background changes. By comparison of the images which have been received by the eyes at two different points in time, one is able to note that the object is nearer to him than its background. Hence some three dimensionality effects can only be revealed to the brain by getting into the fourth dimension, i.e. time. It is the combination of all the above which creates a complete three dimensional concept in the brain. Sometimes the word paralex is used to summarise the effects of three dimensionality. Such a concept is by no means sufficient to explore all that happens in the human brain and it only serves to confuse the subject. Most of the above methods are said to have horizontal paralex but no vertical paralex. What it means is that the picture remains the same if there were a vertical head movement. However if there were a horizontal head movement, in all the above techniques, other than holograms, the picture still remains essentially the same. Instead of referring to horizontal paralex, one should state that these techniques allow limited eye movement within their socket but with no allowance for variations due to head movements.

The recognition of three dimensionality due to the head and eye movements are rather obvious and are rarely explored (see R. Kingslake, "Applied optics and optical Engineering", 1965, Academic Press New York and London, Vol II, chapter 2). What is more complicated is the duality. That is what the brain does with the two distinct images obtained by each eye from the same view at an instant in time. Some are of the belief that the brain has the capability to match every object in view at all times and hence creates a duplicate three dimensional space in the imagination. Some even confuse the effort exerted by the brain to see the view in three dimensions as three dimensional sensation. For example in GB 210472 Stanley, explains a method of one picture stereoscope where the same picture is shown to the viewer for both eye views. True that the brain has to exert the same type of effort to match the two pictures as would have done when looking at reality with two eyes but it is not the physical effort put by the brain which creates the third dimension. It is the information conveyed to the brain which is important. How can two pictures which are the same give the brain more information than they contained originally.

DISCLOSURE OF INVENTION

The present invention is a picture of the would be "merged image in the brain" outside the brain in such a way that if this picture is viewed in replacement of reality, the newly merged image in the brain would be substantially the same. In all other methods of creating three dimensional pictures different signals are sent to each eye. An Imaginograph however is based on going a step further. Rather than creating the signals to be sent to the brain for analysis, an Imaginograph is already the result of the analysed signals. Imaginographs are generalised optical illusions. They psychologically create the illusion of three dimensionality.

If one assumes that the images received with each eye need to be analysed by the brain and every item in view must be matched then one immediately assumes that creation of an Imaginograph is not possible. However, a simple observation shows that this is not the case. If one looks at an object at a distance and at the same time holds a finger in front of his face, one can note that there are two fingers in view both see-through. Now if one looks at the finger the view behind becomes two ghost-like images mixed into each other. The explanation is simple. Referring to FIG. 1, the visual system in human works as follows. Each eye (1) receives a picture of the view. The pictures formed in each retina (2) are slightly different from each other. However the important factor is that the object that one is looking at is formed in the centre of both retinas. The optic nerves (3) from each eye separate into two bundles. The corresponding left and right nerves get mixed in the lateral geniculate bodies (4) and then they continue the route into the Occipital lobe (5). The picture formed by the nerve ends in the Occipital lobe (5) is a combination of the two pictures. These two pictures are slightly different due to the lateral position of the eyes. This picture has the property that the point that the person is looking at, coincides in the two pictures hence that part of the view forms a unique image of an object, double in density. Remainder of the view is left as unmatched. At this stage the brain does not distinguish between signals from right or left eye. That is presumably why the objects that one is not looking at are in double and ghost form. If the person now looks at a different object the eyes move in their sockets so that the new object becomes the centre item in both retinas and thereby the same variation is transferred to the Occipital lobe. Since one only pays attention to the object that one is looking at, one does not feel the dual nature of the picture unless one is especially paying attention to this property.

The picture which is formed in the Occipital lobe is of great interest. This picture has the property that further an object from the main object of interest, further apart are its two images. This distance between the two ghosts follow a certain mathematical formulation. If one wished to analyse this picture, one could identify the distance of the objects from each other. The principle that present invention is based on is that the brain can analyse such dual pictures and by ordering eye movements can focus on one or the other object and get them to coincide at will.

Incidentally, one may note that in some methods of creation of three dimensionality, such as the complementary coloured pictures, it is required that some object in view be registered. However, the reason for their registration requirement is completely different from that in the above principle. Their registration is to keep the main object in the same distance as the projecting surface to avoid confusion of the eye muscles. In those methods lack of registration is not detrimental and does not need to be accurate. In comparison the registration done by the brain needs to at least as accurate as points distinguishable by the eyes. We shall note one other useful observation. When a flat two dimensional picture is put in front of a viewer as in FIG. 2, the distance of both eyes (7) from the picture (6) is the same therefore the pictures (8) which are formed in each eye are substantially the same. Whichever object in the picture the observer is looking at, in the image (9) formed in his Occipital lobe not only the two images of that object will coincide but the rest of the picture will also substantially correspond to each other.

By reference to FIG. 3. assume that a person through his eyes (7) is looking at object (11) in view (10). Object (12) which is at a different distance from the viewer is also in view. The image (14) which is formed in the right eye is different from image (13) which is formed in the left eye. The main distinction is the distance of the objects from each other in the two images. As the viewer is concentrating to see object (11), the brain will merge the two images of that object on top of each other to form image (15). Unavoidably the two images of object (12) will form two distinct ghost-like images (16) & (17). Now with reference to FIG. 2. suppose picture 18, the material reproduction of image (15), is an Imaginograph of the view for the viewer. Suppose now as in FIG. 2., picture (18) is presented to the viewer in replacement for the actual view. Despite the fact that images (19) & (20) formed in the eyes are different from the previous images (13) & (14), the newly formed image (21) in the brain would substantially be the same as image (15) in FIG. 3. As it is not the eyes which recognise the picture but the brain, the newly formed picture looks to the viewer three dimensional as if it were the reality.

The result being that the cumbersome task of creating two distinct pictures on the same screen and forcing each eye to see only one of them, is removed. However, note must be made that at this point there is no allowance for eye movements or head movements and only the effect of duality is captured. The viewer can only look at the same object that he was looking in the view. But what is important is that the picture on the screen is the resultant picture of merged images. There is no requirement for separation of the two pictures. Indeed there is no requirement to have two eyes! It will be transmitted to the brain in the same form, whether looked at with one eye or two. An Imaginograph is the first experience of a three dimensional image to a one eyed person. A single frame of this picture does not look like what one expects of reality. Most items are ghost-like and have doubletones. But if that is what is formed in the brain, assuming that one would be happier to have a finished product rather than the raw material, then the brain is happier to receive a pre-analysed picture rather than two separate pictures needing to be analysed. This could mean that looking at an Imaginograph is more pleasant to the brain than looking at reality itself.

The matter which requires further clarification is producing the ghost like images. In general what we need is presentation of two images to the viewer in a way that he believes that he is seeing the two pictures together. This can be done is three general forms.

One method is to produce a picture that every point of that picture is the average colour of the two corresponding points in the two pictures. This is possible in variety of methods. The simplest form is to take two pictures in slide form and project them together on a screen. This image can also be printed on a photographic paper to obtain a hard copy. In general this technique is called superimposing the two pictures. There are variety of photographic methods to do this. One can also use electronic mixing techniques in video and televisions or in computers.

The second method is to use the limitation of ability of the viewer to distinguish between pictures in time i.e. to show the viewer both pictures alternatively in a short space of time less than the flicker of the eye so that the viewer cannot distinguish between them. The viewer will see these as two ghost like merged images.

The third method is using the limitation of ability of the viewer to distinguish between points on the view. One can use the method of half toning the pictures using a complimentary grid for each of the pictures. From the dots that make up each picture only half of them are selected and transferred into the new picture in such a way that every dot on the new picture is from one or the other picture. So long as the dots used are equal or less than the smallest distinguishable area for the eye the picture so produced looks as though the two pictures are ghost like and merged into each other.

In general I define the point average of two pictures to be a picture where the viewer believes that he can see the two pictures together either because each point of this picture is the average colour of the two or each point is shown to him in less time than he can distinguish them or half the points of each of the two pictures are mixed into each other in smaller areas than his eyes can distinguish or a combination of the three.

Hence what this invention entails is the point average of right eye view and the left eye view of a three dimensional space. The pattern that such a picture produces in the Occipital lobe is substantially the same as what is produced if the viewer were looking at the left eye view with the left eye and the right eye view with the right eye. Note that this pattern, in general, is substantially the same but not necessarily exactly the same as reality. Since the number of visual nerves are finite, if one uses the half toning method for a particular viewer, one can theoretically produce a picture where the right eye optical nerves pick up only the points which belong to the right eye view and the left eye nerves pick up the points for left eye view. Such an Imaginograph will produce exactly the same pattern on the viewer's Occipital lobe as would have done the reality. But this though of interest is not a major point. It is not the exact pattern which is needed for the brain to see the third dimension. What is important is that the pattern conveyed to the brain has enough information about the third dimension and is presented to the brain in a method that it can understand to analyse. That is producing two ghosts of the view where the further apart the objects the further apart their ghosts.

As noted above, there is much analysis done in the brain for the formation of a three dimensional illusion. A single shot Imagingraph only caters for the effect of duality. The viewer can only look at a pre-selected object in the view. However using such a picture as the base one may choose to create all or some of the analysis done by the brain, outside the brain. One may also produce a partial analysis of some of the conditions, or even produce some analysis which are not completely the same as would have been done by the brain. This may be due to imperfect technology or a desired effect to produce a quasi-analysed result. Hence there are a variety of Imaginographs of the same view. In general Imaginographs can be classified as follows:

A. Simple Imaginograph:—A Simple Imaginograph is a picture which is obtained by reproducing the analysed picture(s) as would have been done by the brain at only a single instant in time, i.e. presenting the viewer with only a single shot of a point average of the two left and right eye views of the would be image. Note that to reflect the reality, the size of the picture presented to the viewer must be the same as the size of the real view and the distance of it must be the same as the main object in view. Alternatively if one were to scale down or up the image then the size of the picture and its distance from the viewer must be scaled down or up in the same ratio whilst the distance between the cameras which took the pictures must have been the reverse scale. For example if one were to produce the image in half the size of reality then to take the pictures one should assume the reality to have been twice the size including the distance between the eyes and thereby place the original cameras at 13 cm apart rather than 6.5. In a Simple Imaginograph only the effect of duality is considered, eye or head movements do not change the graph.

B. Composite Imaginograph:—A Composite Imaginograph is a picture which is obtained by reproducing the analysed picture(s) as would have been done by the brain allowing the duality and also providing variations for eye movements and or head movements. In this case the picture which is presented to the viewer is a Simple Imaginograph which varies in time. For example to allow for eye movements, as the willingness of the viewer to look at a different object than the main object in view must be detected and the registration of the two pictures must be changed to obtain a new point average of the view.

C. Complete Imaginograph:—A Complete Imaginograph is a picture which is obtained by reproducing the analysed picture(s) as would have been done by the brain allowing for the viewer to be able to do any eye movements and also head movements as he wishes. The requirement for a Complete Imaginograph is to have many pictures of the view from different angles and distances and to point average them as the viewer makes any movement to accommodate for the will of the viewer. True that such a production may be cumbersome but the result is to reflect the reality in total.

D. Quasi Imaginograph:—A Quasi Imaginograph is a picture formed in the same way as A, B or C above following the same analysing technique of the human brain with the difference that the measurements used in its production are not the same as a human or the reality. For example one could take the original pictures by placing the two cameras at further distance then the eyes in order to magnify the effect of paralex or nearer to reduce the effect. One could present the picture to the viewer at a different scale or present it to the viewer at a different distance. One could take two pictures with two cameras at a distance apart and when projecting them back use projectors which are at a different distant apart. This has the effect that the three dimensional space looks non-Euclidean. Though the brain, due to past memory, may have problems in identifying such pictures as three dimensional space, but it will soon learn to analyse them.

Figure 2:
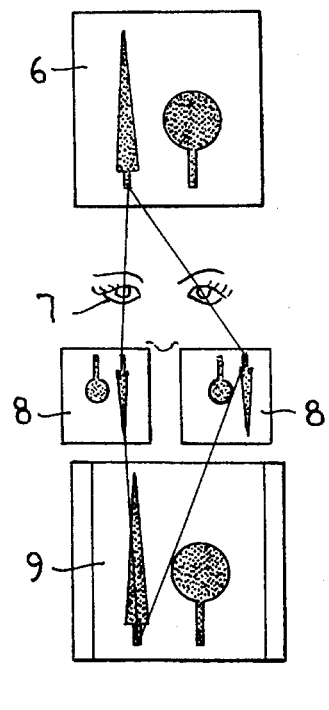
In FIG. 2 it is shown that if a flat picture (6) is put in front of the two eyes (7) their images (8) in each eye are substantially the same. Hence their mixture in the Occipital lobe in the brain forms a new picture (9) which is substantially the same as the original picture (6).
Figure 3:
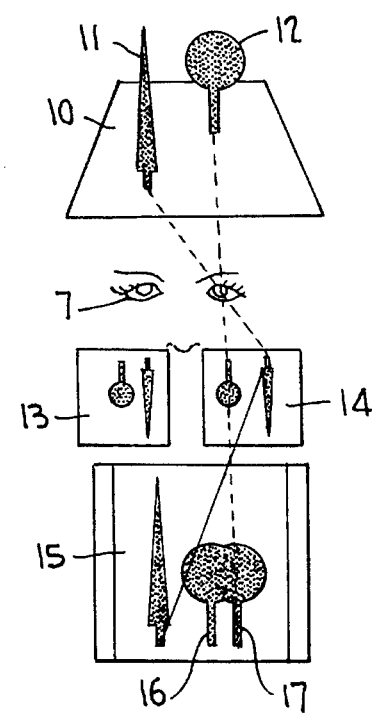
FIG. 3 shows that if two objects (11) & (12) in a three dimensional space (10) are viewed by the two eyes (7) their images (13) & (14) in the left and right eye are slightly different i.e. the relative position of their images differ because of the lateral position of the eyes. If the viewer was looking at the object (11) then the picture formed in the Occipital lobe (15) coincides the two images of object (11) into a single image but the two images (16) & (17) of the object (12) form two separate images in ghost form.
Figure 4:
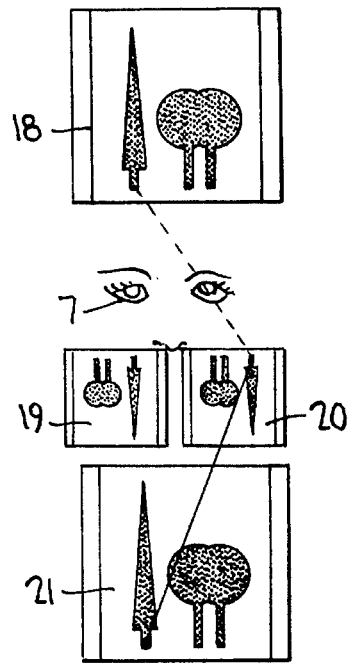
FIG. 4 shows that if picture (18), a picture which is substantially the same as Image (15) in FIG. 3 is placed in position of object (10), the new image (21) in the Occipital lobe shall be substantially the same as image 15. Despite the fact that the new images (19) & (20) in the eyes are different from previous images (13) & (14), what is transmitted to the brain remains substantially the same as before.
Figure 1:
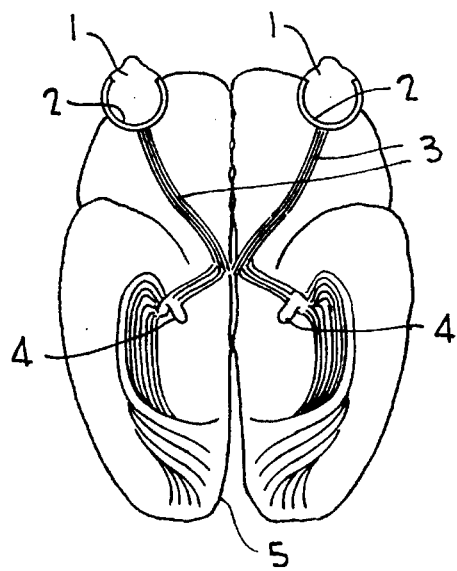
FIG. 1 represents a standard sketch of human brain and its optical nerve system. This shows how from each eye (1) the nerves from retinas (2) each divide into two bundles (3) and the corresponding nerves from the left and right become a new bundle at geniculate bodies (4) and they end up at the Occipital lobe (5). As at the Occipital lobe there is no distinction between the right and left eye nerve-ends, from then on, the brain can only recognise one picture. This is why the reality seems always in two ghost forms mixed into each other.

FIG. (6) shows how one can angle the two cameras (31) & (32) (with lenses (33) & (34)) but keep the film plates (35) & (36) parallel to the line of cameras (37). The two pictures obtained in this way have the property that if their films are superimposed and then projected on a screen at the same distance as object (30) the resultant picture will be the point-average of a bi-focal projection.

MODES FOR CARRYING OUT THE INVENTION

At this stage by looking at a specific way to carry out the invention and some of its variations we shall demonstrate how to produce Imaginographs.

Figure 5:
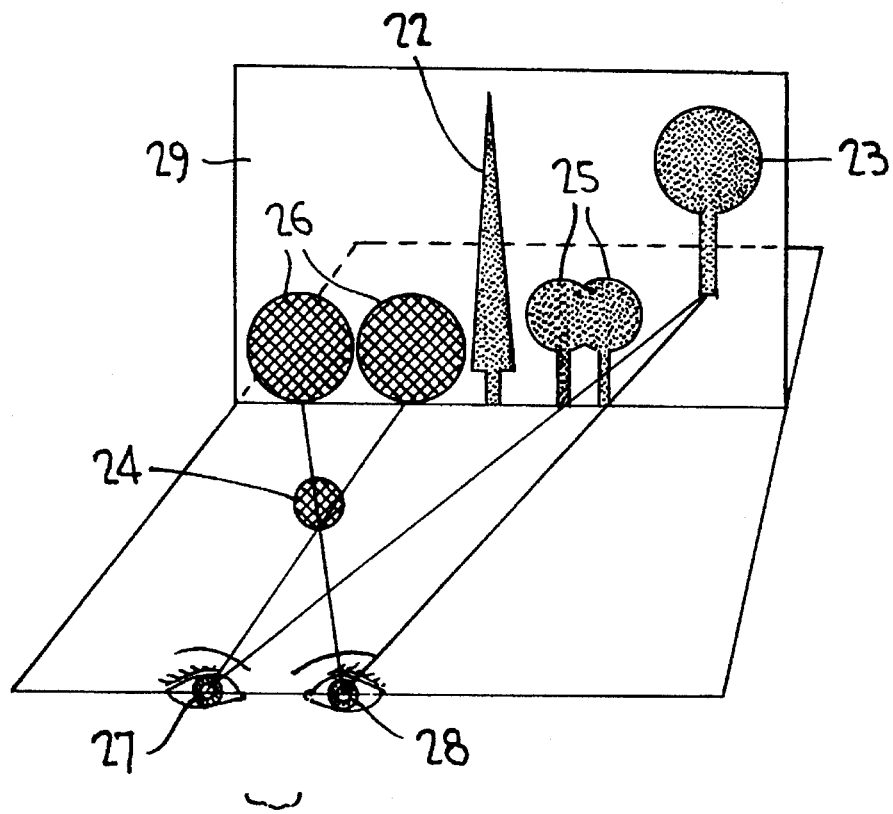
FIG. 5 shows how to obtain the bi-focal projections of a three dimensional view. If one assumes that the viewer is looking at object (22) in the view, then a vertical plain (29) is placed parallel to the line of eyes. The whole of view is projected from the position of the left eye (27) and then from the position of the right eye (28). This is referred to as a pair of Bi-focal projections. The two images shall coincide on the image of object (22) but the two images (25) of object (23) which is further away than object (22) become into two smaller images (25) and the two images (26) of object (24) which is nearer than object (22), form two distinct images bigger than the object itself. These two images are the bi-focal projection of the view and their point-average is a Simple Imaginograph.

It was explained in the previous sections that Imaginograph is the point average of two pictures. However, depending on the type of Imaginograph that one is aiming to produce the selection of the two pictures may vary. Starting from a Simple Imaginograph, by reference to FIG. 5. suppose that the viewer is looking at a view with three objects (22), (23) and (24) in view. Further suppose that the viewer is concentrating to see object (22). Place a vertical screen (29) parallel to the eyes in the position of object (22). Project all the images of all three objects on the screen as seen by the left eye (27) and then project the images as seen by the right eye (28). For convenience, I shall name the canonical projection of a view on a screen from two distinct points, a pair of bi-focal projections of the view. Now the point average of these two pictures forms the Simple Imaginograph of the view.

A practical way to produce these ghost-like pictures is to replace each eye with a camera at the same position as the eyes. Take two pictures and then using the same cameras at the same relative position project them on a screen at the same distance as object (22). The two images of the object (22) shall coincide on top of each other whilst the two images (25) of object (23) and (26) of object (24) become into doubleton ghosts. The resultant picture will be a Simple Imaginograph of the view producing the same image on the brain as would have been obtained by the view itself. Note that the screen (29) does not have to be a flat plane, it can be of any shape. The screen does not even have to be solid so long as the image conveyed to the viewer is the point average of a bi-focal projection.

What is produced at this stage is a Simple Imaginograph. Now one can add other effects to obtain many Composite Imaginographs. For example one can put a sensor in front of the viewer to sense the position of the eyes in their sockets in order to analyse their angle to find out the distance that the viewer is looking at. The screen that the images are projected can be automatically moved to that desired distance. This movement has two effects. One is that the image is formed at the distance that the viewer expects and thereby his eye muscles would have the same pressure for focusing as he expects. The second and more important effect is that the objects which are at that particular distance are now going to coincide with each other and hence the viewer has complete replication of eye movements as he would have had in reality. To allow for head movements one needs to use several pairs of projectors with several double pictures and also several screens or a spherical expanding screen. As the viewer moves his head the corresponding projectors need to switch projecting to create the new bi-focal projections and a new Simple Imaginograph at the position that it is required.

The above method recreates all the effect of reality in order to produce a Complete Imaginograph so as to recreate the illusion of reality. The only difference being that the duality is pre-analysed outside the brain. When one notes that most of the efforts exerted by humans is to match the main object of interest, then one does not need to recreate all the problems that the viewer is faced in reality to give him the sensation of three dimensionality. In many situations a Simple, Composite or a Quasi Imaginograph would serve the purpose much better. For example, take two pictures of a view with two cameras which are eye distance apart. Project them back on a screen matching the main object in view. Now a small horizontal motion of the projectors can cause the image of the main object to become two ghosts while another object which was two ghosts becomes one solid image representing the new main object. This has the same effect on the brain as the viewer changing his attention from the first object to the second (parallel movement of the eyes in their sockets). Suppose that this movement of the projectors are controlled by the viewer either manually or by a device which recognises the movements of the viewer or even a device which recognises the wish of the viewer by analysing his brain signal. The effect is the same, the viewer can look at whichever part of the picture that he wishes without having to make his eyes move in their sockets and without having to refocus for distance adjustments. This Composite Imaginograph will create the concept of three dimensionality for the viewer with less physical effort than even looking at the reality. Effectively the sensation is the same as dreaming with one's eyes open.

Notice should be made that individual eye distances and conditions are different from one another, hence a perfect Imaginograph formed for one person would be a Quasi Imaginograph for another. The second viewer will see the image as if from the eyes of the first viewer. A one eyed person looking at a Simple Imaginograph will see the view from the eyes of a two eyed person. Quasi Imaginographs are useful and interesting pictures and not merely the result of imperfection. For example a still (single shot) Simple Imaginograph can be produced as in the above example by purposefully assuming that the viewer's eye distance is much larger than reality. Such a Quasi Imaginograph will have the effect of speedily directing the attention of the viewer to the main subject in a picture by producing extra sharpness. This is particularly of interest in creating advertising posters and the like. The reverse is also true. If one takes the two pictures at a distance of less than the average eye distance, then the resultant Imaginograph will attract the attention of the viewer to the main object in the picture but the attraction is very slow and subtle.

An important Imaginograph is when one needs to re-scale the reality. Most of today's picture presentations are not the same size as the model. Passport photographs are considerably smaller than the reality where outside posters or cinema screens are much larger than the original. If such pictures are shown in the conventional two dimensional fashion then the same negative can be used to print whatever finished size. However, if one is reproducing an Imaginograph, half the size of reality, the consideration of depth forces one to have taken the two original pictures with cameras which were twice the eye distance apart. Of course one could use the same originals to produce different sizes of Imaginographs and present it to the viewer at varying distances. These, of course would be Quasi Imaginographs that convey the same type of information to the brain about the depth but they will not coincide with viewer's memory. The viewer is bound to assume a different depth than the reality. This, however is not an important consideration. The human brain is not limited by past memories and by seeing repeated out of scale depth, soon will adjust to analyse the information in the new format so long as one does not keep changing the format.

Figure 6:
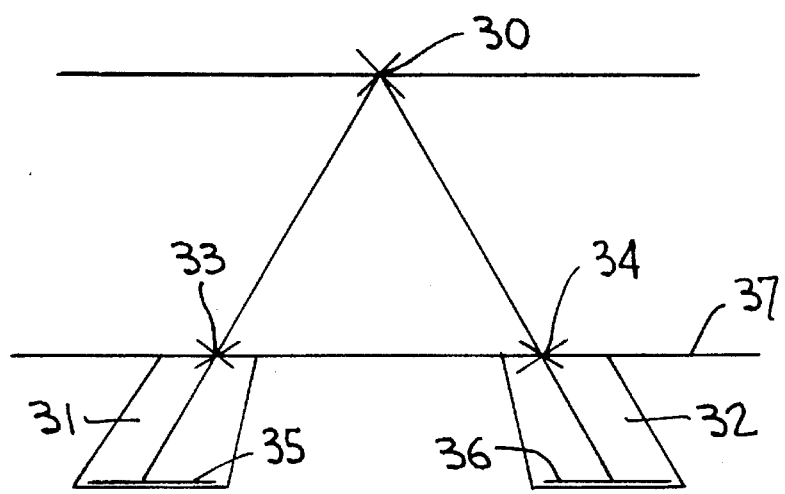

The use of two cameras and two projectors, though has its advantages, creates practical problems. When one is trying to produce movies, the timing and matching of the images create a cumbersome task. It would have been advantageous to be able to mix the images first and use only one image to project back. However, if the films were point averaged first and then projected, the result would be a non-Euclidian Quasi Imaginograph. In case of distant objects, this picture would nearly be the desired bi-focal projections, but for near objects they vary enormously. The same type of problem occurs when one uses electronic mixing devices. It would be a heavy task to organise the mixing device to allow for the angle of projection in order to obtain the correct pair of bi-focal projections. One can overcome this problem by using a photographic technique as in FIG. 6. To produce the picture of object (30) the two cameras (31) & (32), with lenses (33) & (34) located at eye distance (or the required scaled distance) apart, are viewing object (30). However, the film plates (35) & (36) are kept parallel to the line (37) i.e. the line joining the cameras. The pictures obtained in this way have the property that if they are projected back from the central position onto a screen located at the same distance as (30) then one obtains the desired bi-focal projections. Using this method it is possible to superimpose or in general point average the two images first and then project them back on the screen. This method has a clear advantage when one is using videos cameras as one can simply mix the two images using a normal image mixer.

The creation of motion picture Imaginographs would be simple enough. One only needs to replace each normal frame with its equivalent average person Imaginograph. To put it another way, one needs to reproduce consecutive Imaginographs at less than the flicker of the eye. All said above can be produced using film cameras and projector screens or video cameras and televisions or indeed computers.

It is worth mentioning that graphic Imaginographs from non-real objects i.e. cartoon type can easily be made using what is called Cad-Cam techniques to obtain the bi-focal projections.

Industrial Applicability

Pictures play an important part of our lives. Ever since the invention of camera many efforts have been put on producing better colours, better prints, sharper images and many forms of lenses and facilities to obtain such pictures. The simplicity of camera has made us think that photographs are the best representation of reality. The pictures which are made by cameras are the same as the pictures which are made by a single eye. If one notes that it is not the human eye but the human brain which recognizes the picture then one realises that what we have been looking at for over 150 years is not what we understand of the reality. What the brain understands is Imaginographs and not photographs. Photographs do in a way reflect the third dimension, the nearer the object the bigger. What they do not represent is what the brain understands of the reality i.e. the duality. In practice, Imaginographs can replace nearly all mono-projections i.e. the photograph type pictures. Their least advantage is that they would be better pictures. In the same way that a technical drawing can be more useful to a technician than the photograph of an object, the photograph in some circumstances may prove more appropriate than Imaginograph. However if one is attempting to reproduce reality, the Imaginograph is a much better candidate.

Of course, matters are not as simple as replacing all the photographs in the world. Though it is possible to make Complete Imaginographs, they are fairly complicated and subjective pictures. However in most cases one does not need to recreate reality in all respects. There are variety of Simple, Composite and Quasi Imaginographs that are easy to make and achieve results which were not possible to make previously.

For example, if one makes an average Simple Imaginograph, this needs to be viewed from a certain distance to have three dimensionality effect and it would not cater for eye movements i.e. the viewer needs to be looking at the main object. But is it not true that most pictures are made for certain distances and is it not true that in most pictures there is a centre of attention. Televisions are normally viewed in about three meters and nearly always the person who is talking is the centre of attention. This means that Simple Imaginographs are good candidates to make television programs that look real or three dimensional. There is no need to change the television sets and no need for any viewing devices. The decision as to the object to look at is made in production stage. It shall be up to an artist producer to keep the viewers attention to the main subject by artful manipulations.

Posters are made in sizes which are comfortable to look at, at a certain distance. Simple imaginographs again can prove of use. In advertising pictures the aim normally is to bring the attention of the viewer to a certain item. This is usually done by using shallow depth of field and by making the particular object extra sharp. The old method works, however a Simple Imaginograph works even better. When one prepares an Imaginograph, the logic behind the production is the main object of attention. Hence if an item is being advertised using Imaginographs, one shall be attracted to look at a particular item because, in that picture, that is the item which is being looked at. One can use Quasi Imaginographs to increase or decrease the attraction to a particular item at will. One could easily make computerized pictures placed at walkways and escalators which allow for movement of the person and look amazingly three dimensional.

There are many possibilities with Imaginographs which are not available with photographs. It is normal to hear that a person is photogenic. What it means is that his mono-projection looks good. Whith Imaginographs there are variety of possibilities to make a person look exactly the same as himself or make him look slimmer or bigger or smaller by using the rescaling methods or Quasi Imaginographs.

These are just some simple every day uses that this invention can have. It is the simplicity of Imaginograph which makes it a universally useful invention. When one considers that the concept of image as our brain understands it has not been explored before, I believe, the concept must be explored further and further uses be made of it.

I claim:

1. A combination picture consisting essentially of a substantially planar support member, the support member carrying a first two-dimensional image of a three-dimensional scene and, superimposed thereon a second two-dimensional image of the three-dimensional scene and in the same color or colors as the first two-dimensional image but as seen from a position laterally displaced by a distance from that from which said first two-dimensional image is viewed, superimposition of the first two-dimensional image and the second two-dimensional image being such that a common point of visual interest in the three-dimensional scene of each two-dimensional image is positioned on said support member at a common point.

2. A picture according to claim 1 wherein the support member is a screen and said first two-dimensional image and said second two-dimensional image are alternately displayed thereon at a rate sufficiently rapid to prevent an eye from distinguishing between said first two-dimensional image and said second two-dimensional image.

3. A picture according to claim 1 which the first two-dimensional image and the second two-dimensional image are presented in half-tones provided by dots wherein half the dots are omitted from each of the first two-dimensional image and the second two-dimensional image such that each missing dot in one image corresponding to a non-missing dot in another image.

4. A picture according to claim 1 wherein each point of the picture on the support member is of an average color based on each corresponding point of each individual image.

5. A picture according to claim 1 wherein said distance is substantially equal to distance separating human eyes.

6. A picture according to claim 1 wherein said distance is substantially different from distance separating human eyes.

7. Apparatus for viewing images comprising a combination picture according to claim 1, means for detecting eye position of a viewer, and means for modifying images on the support member in dependence on movement of the eyes of the viewer.

* * * * *